US008239585B2

(12) United States Patent
Wang et al.

(10) Patent No.: US 8,239,585 B2
(45) Date of Patent: Aug. 7, 2012

(54) SYSTEMS AND METHODS FOR IMPROVED HARDWARE DEVICE CONNECTIVITY

(75) Inventors: Brett Wang, Shanghai (CN); Minqiang Wu, Shanghai (CN); Winters Zhang, Shanghai (CN); Hongbing Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 11/992,862

(22) PCT Filed: Sep. 29, 2005

(86) PCT No.: PCT/CN2005/001622
§ 371 (c)(1),
(2), (4) Date: Aug. 10, 2009

(87) PCT Pub. No.: WO2007/036071
PCT Pub. Date: Apr. 5, 2007

(65) Prior Publication Data
US 2009/0300230 A1    Dec. 3, 2009

(51) Int. Cl.
*G06F 3/00* (2006.01)
*G06F 13/00* (2006.01)
*G06F 13/20* (2006.01)

(52) U.S. Cl. .................. 710/11; 710/33; 710/313
(58) Field of Classification Search .............. 710/33, 710/11, 313
See application file for complete search history.

(56) References Cited

U.S. PATENT DOCUMENTS

| 5,349,668 | A | * | 9/1994 | Gladstein et al. ............ 713/340 |
| 6,324,542 | B1 | | 11/2001 | Wright, Jr. et al. |
| 2002/0059479 | A1 | * | 5/2002 | Hardy et al. ..................... 710/1 |
| 2003/0217212 | A1 | * | 11/2003 | Kim .............................. 710/305 |
| 2003/0221155 | A1 | * | 11/2003 | Weibel et al. ................. 714/752 |
| 2004/0117463 | A1 | * | 6/2004 | Reister .......................... 709/220 |
| 2004/0122986 | A1 | * | 6/2004 | Diamant .......................... 710/5 |
| 2004/0230710 | A1 | | 11/2004 | Goodman |
| 2005/0236491 | A1 | * | 10/2005 | Leaming ...................... 235/492 |

OTHER PUBLICATIONS

"International Search Report for corresponding PCT Application No. PCT/CN2005/001622", 3 pgs.
"Written Opinion of the International Searching Authority for the corresponding PCT Application No. PCT/CN2005/001622", 3 pgs.

* cited by examiner

*Primary Examiner* — Chun-Kuan Lee
*Assistant Examiner* — Farley Abad
(74) *Attorney, Agent, or Firm* — Schwegman, Lundberg & Woessner, P.A.

(57) ABSTRACT

Systems and methods are described herein to provide for improved hardware device connectivity. Other embodiments include apparatus and system for receiving messages from an operating system and sending messages to one or more hardware devices. Further embodiments include methods for receiving messages from an operating system regarding operations on a hardware device and responding to those messages. Other embodiments include methods for receiving interrupt messages and mapping those interrupt messages to hardware devices. Other embodiments are described and claimed.

15 Claims, 7 Drawing Sheets

SYSTEMS AND METHODS FOR IMPROVED HARDWARE DEVICE CONNECTIVITY

RELATED APPLICATION(S)

This application is a U.S. National Stage Filing under 35 U.S.C. 371 from International Patent Application Serial No. PCT/CN2005/001622, filed Sep. 29, 2005, and published on Apr. 5, 2007 as WO 2007/036071 A1, which is incorporated herein by reference.

TECHNICAL FIELD

Various embodiments described herein relate generally to device driver operations and more particularly for providing improved connectivity for hardware devices.

BACKGROUND

Presently, a computer user extending functionality of their computing device seeks to do so by adding a hardware device to the computing device. The computer user may wish to have scanning capability and would then hook up a scanner to their device and then proceed to scan their pictures or documents. Many different standards for connectivity of these hardware devices have been proposed and adopted.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

In the following detailed description of, reference is made to the accompanying drawings which form a part hereof, and in which are shown, by way of illustration, specific preferred embodiments in which the subject matter may be practiced. These embodiments are described in sufficient detail to enable those skilled in the art to practice them, and it is to be understood that other embodiments may be utilized and that logical, mechanical, and electrical changes may be made without departing from the spirit and scope of the present disclosure. Such embodiments of the inventive subject matter may be referred to, individually and/or collectively, herein by the term "invention" merely for convenience and without intending to voluntarily limit the scope of this application.

Figure 1:
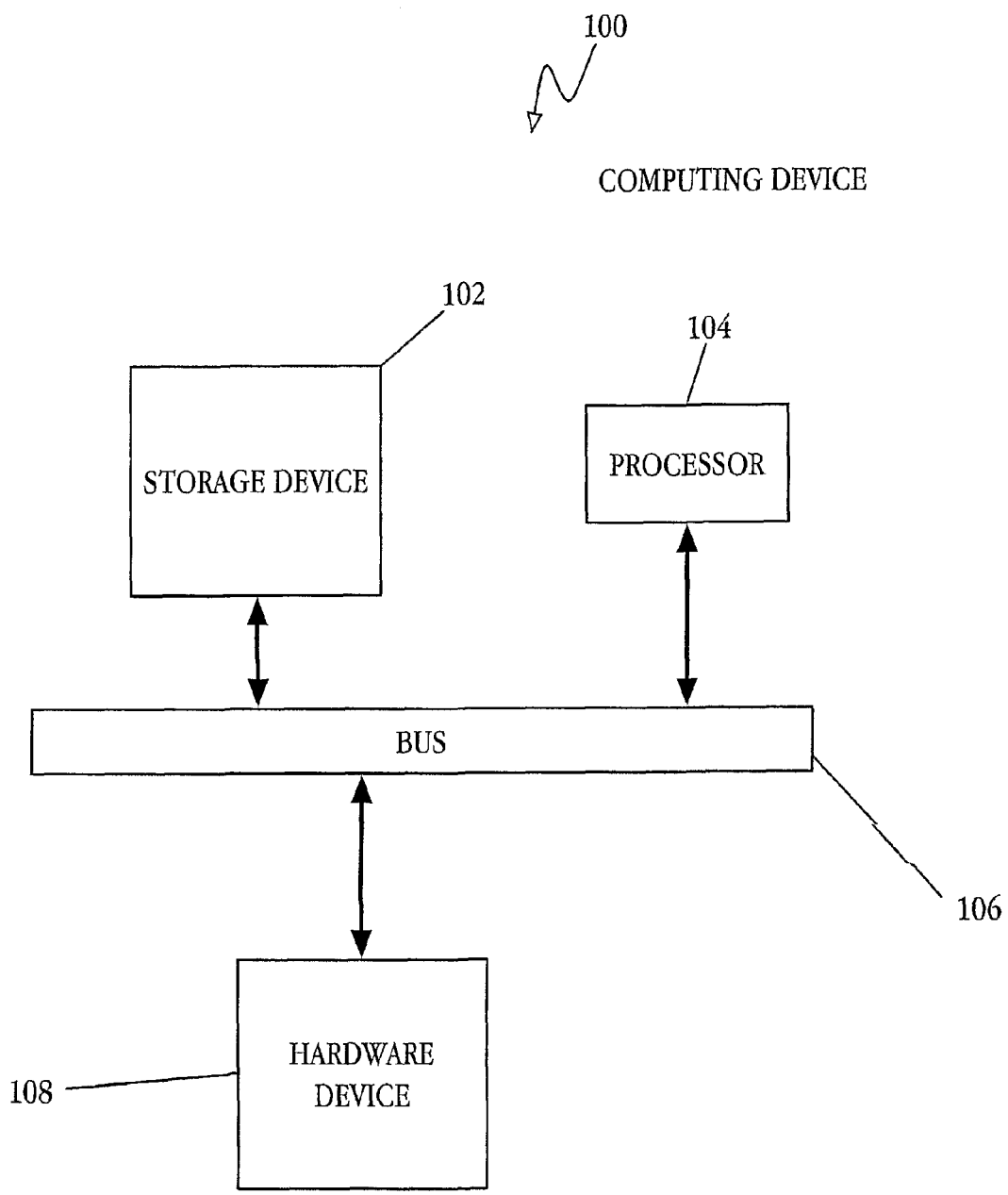
FIG. 1 is a high level block diagram of a system according to embodiments of the present invention.

FIG. 1 is a high level block diagram of a system according to embodiments of the present invention. In an embodiment, a computing device 100 includes a storage device 102 and a processor, 104. In an embodiment, the storage device 102 and the processor are communicatively coupled through a communications bus 106. In an embodiment, a hardware device 108 is coupled through any suitable means to the computing device 100. The communications bus 106 represent one or more busses, e.g., Universal Serial Bus (as detailed in the Universal Serial Bus Specification, Revision 1.1, published Sep. 23, 1998 and later versions, hereinafter USB specification), FireWire, PCI, ISA (Industry Standard Architecture), X-Bus, EISA (Extended Industry Standard Architecture), or any other appropriate bus and/or bridge (also called a bus controller).

In an embodiment, the computing device 100 is configured to execute machine readable instructions contained on the storage device 102 implementing an operating system and other software applications, including routines and software operations other then an operating system that in some configurations are capable of controlling input/output operations, routines, or interrupt handlers on the computing device 100. Operating systems may include operating systems based on Windows®, UNIX, Linux, Macintosh®, and operating systems embedded on a processor. The computing device may include, without limitation, desktop PC, server PC, PDA, etc. In one embodiment, the machine readable instructions are executed by the processor 104. Though drawn as single blocks in FIG. 1 it is understood that the computing device 102 may contain more then one storage device 102 and more then one processor 104. Further, the machine readable instructions executing by the processor 104 of the computing device 102 may be contained on a storage device 102 external to the computing device 100, such as across a network.

In an embodiment, the hardware device 108 is any electronic device that is configured to be coupled to the computing device 100 in any suitable manner thereby extending the functionality of the computing device. Examples of hardware devices 108 include, without limitation, mass storage device, such as external hard drives; multimedia player devices, such as mp3 players; input devices, such as keyboards and mice; and display devices, such as monitors and many other internal and external devices. An example of a hardware device internal to the computing device 100 may be a modem, etc.

Figure 2:
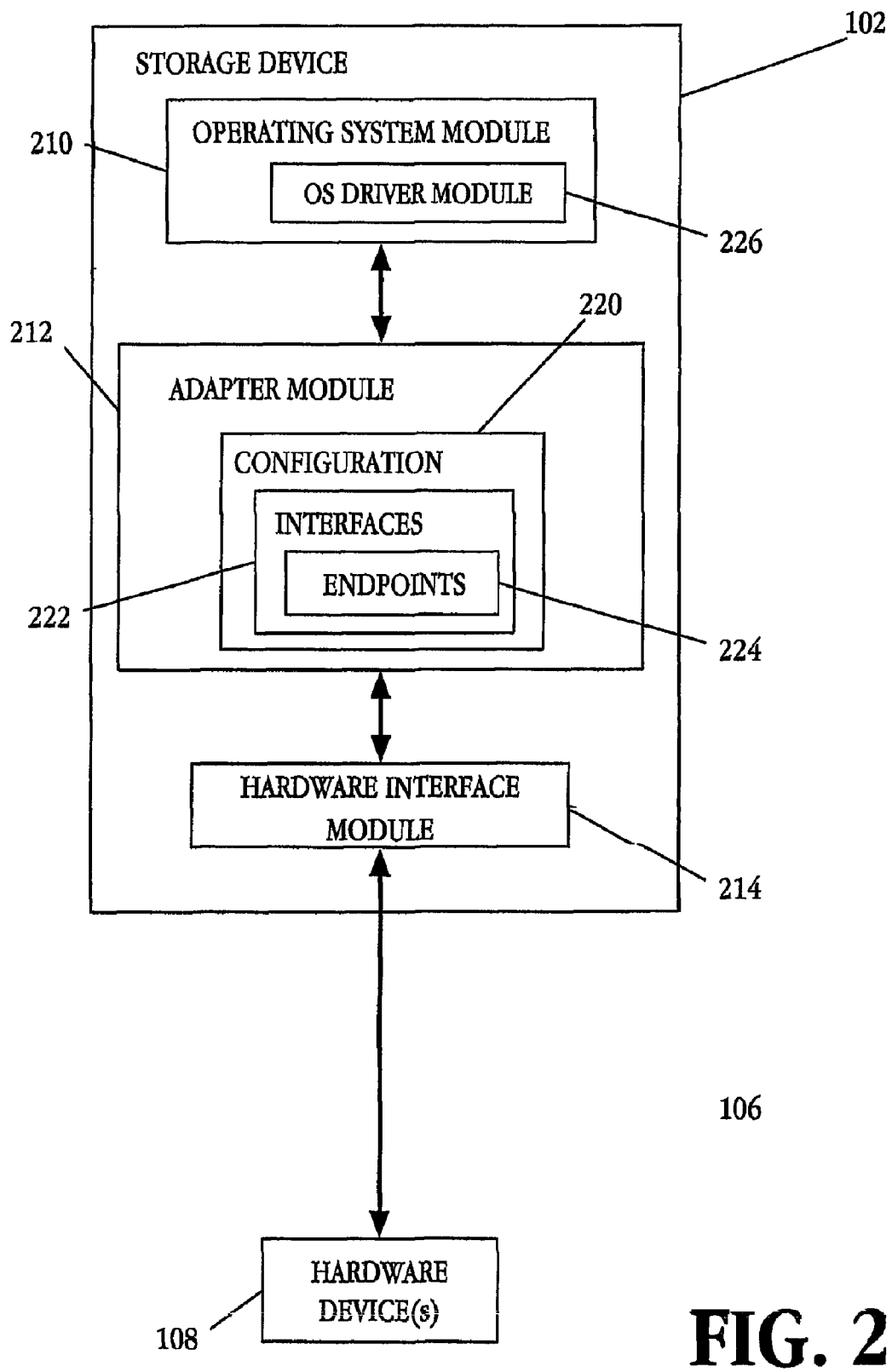
FIG. 2 is a high level block diagram of a device according to embodiments of the present invention.

FIG. 2 is a high level block diagram of a device according to embodiments of the present invention. In an embodiment, the storage device 102 includes machine-readable instructions contained therein to execute the following modules: operating system module 210, adapter module 212 and hardware interface module 214. In a further embodiment, the adapter module 212 includes a configuration 220, one or more interfaces 222 and one or more endpoints 224. In one embodiment, the configuration, one or more interfaces and the one or more endpoints are hard-coded and can not be changed. In another embodiment, the configuration, one or more interfaces, and one or more endpoints are able to be altered in any suitable manner. The operating system module 210 includes at least one OS driver module 226. The modules may include hardware circuitry, single or multi-processor circuits, memory circuits, software program modules and objects, firmware, and combinations thereof, as desired by the architect of the computing device 100 and as appropriate for particular implementations of various embodiments. The modules may be included in a system operation simulation package such as a software electrical signal simulation package, a signal transmission-reception simulation package, or any combination of software and hardware used to simulate the operation of various potential embodiments. Such simulations may be used to characterize or test the embodiments, for example.

In an embodiment, the adapter module 212 includes hardware device data corresponding to the type of hardware device 108 connected to adapter module 212 via hardware interface module 214. The hardware device data includes configuration data 220 that corresponds to the protocol type for a particular hardware device. By way of example, but not by way of limitation, adapter module 212 may include configuration data corresponding to the USB specification. The configuration data includes hardware information, interface data, endpoint data, communications protocol, and other information corresponding to the protocol type utilized by the particular hardware device.

The configuration data includes a description of how many interfaces of the same type are connected to the computing device. For each type of hardware device 108, there is one adapter module 212 that includes configuration data 220 for the corresponding type of protocol. In an embodiment, a single hardware device 108 is coupled to a single adapter module 212. In another embodiment, multiple hardware devices 108 each using a different type of communications protocol are coupled to the computing device which contains multiple adapter modules and each one of the multiple adapter modules corresponds to one type of communications protocol.

In an alternate embodiment, multiple hardware devices 108, each using the same type of communications protocol, are coupled to a single adapter module 212. In this case, the configuration data describes one or more interfaces of the same type. For each of the one or more interfaces of the same type, there may be one or more endpoints defined by the USB specification. Endpoints are the basic input/output unit in a hardware device.

In an embodiment, the adapter module 212 is coupled to and communicates with the OS driver module 226 as a USB device. In a further embodiment, the adapter module 212 maintains data about the hardware device 108 in the form of hard-coded hardware device data so that the adapter module 212 can respond to configuration and data requests from the OS driver module 226 and higher level operations. As depicted in FIG. 2, the adapter module 212 includes hard-coded configuration data 220 describing one or more hard-coded interfaces 222. The one or more hard-coded interfaces 222 describes the functions that the hardware device 108 can perform and includes one or more hard-coded endpoints 224 and are the basic I/O unit for the type of hardware device.

In an embodiment, the storage device 102 further includes a hardware interface module 214 coupled through an appropriate communications bus to the hardware device 108. The hardware interface module 214 is configured to receive messages from the adapter module 212 as executed by the processor using the appropriate communications protocol for the hardware device and send those messages to the hardware device 108. In an embodiment, the hardware interface module 214 is external to the hardware device 108.

Figure 3:
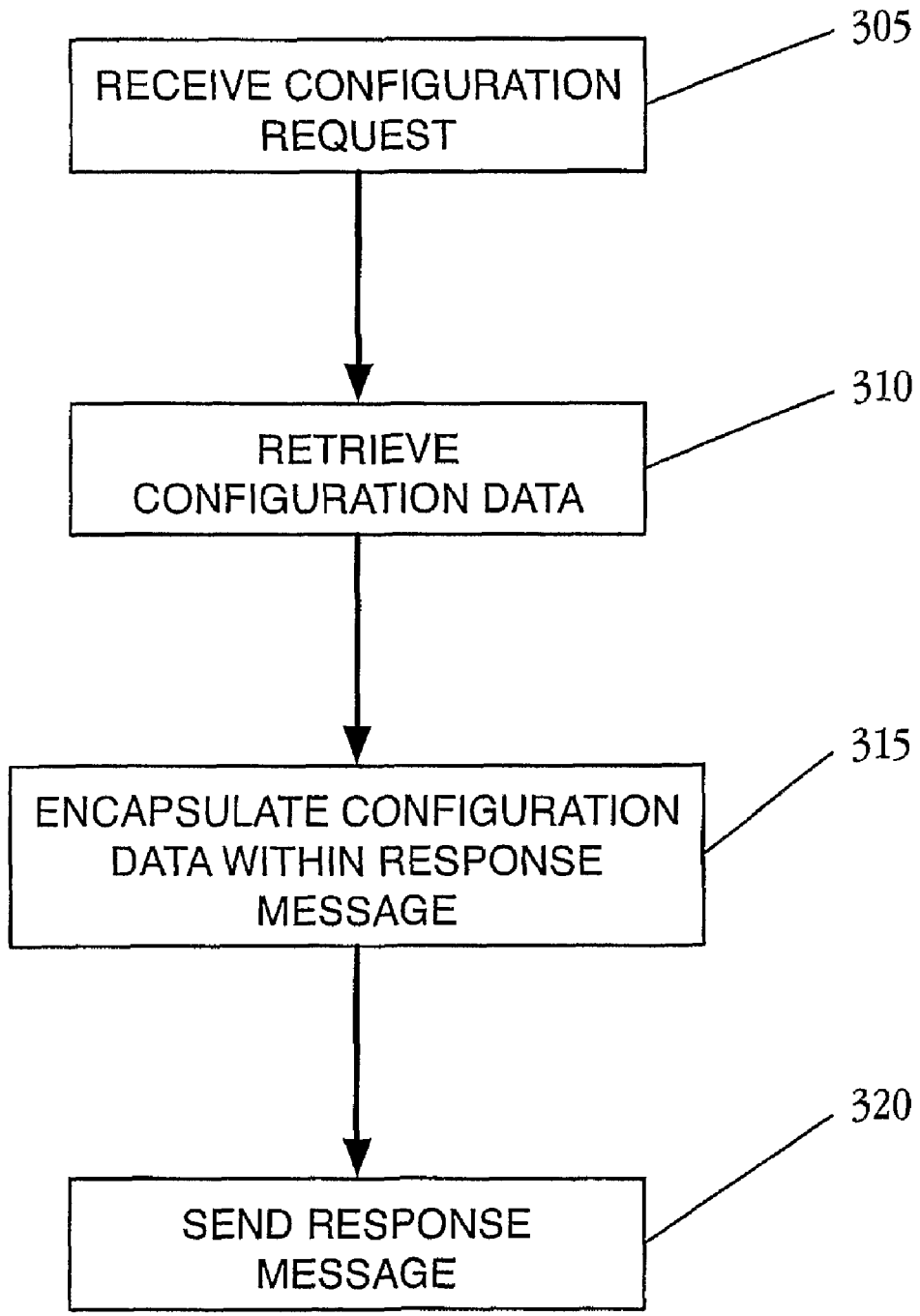
FIG. 3 is a flowchart of a method according to embodiments of the present invention.

FIG. 3 is a flowchart of a method according to embodiments of the present invention. In an embodiment, the operations contemplated in FIG. 3 are to be carried out by an adapter module 212 as depicted in FIG. 2 and described above. At block 305 a configuration request message is sent to the adapter module 212. The adapter module 212 operates with respect to the operating system module 210 and the OS driver module 226 as a hardware device. In one embodiment, the configuration request message is an USB Request Block (URB). The configuration request message may be sent for any number of reasons to include, without limitation, system start-up, system re-start and attachment of a new hardware device 108. The adapter module 212 holds the configuration request message for processing and at block 310 retrieves the configuration data that was requested. In one embodiment, the adapter module reads the configuration data from the hard-coded configuration 222. At block 315, the adapter module encapsulates the configuration data into a response message. In one embodiment, the response message is the held URB with the configuration data encapsulated within it. At block 320, the adapter module 212 sends the response message to the driver module 228.

In one embodiment, the operations depicted in FIG. 2 are carried out whenever the host operating system, or operating system module 210 in the context of the present discussion, polls for configuration of attached hardware devices 108. As discussed above this may be the result of initial system start-up or restart. Additionally, as new hardware devices are attached, the host operating system needs to properly configure itself to communicate with them. In the context of hardware devices configured to communicate with the host operating system using a communications protocol supported by the OS driver module 226, the adapter module is not used. However, when a hardware device 108 is attached that does not communicate using a protocol supported by the OS driver module 226, an adapter module 212 is executed to handle communications between the host operating system and the hardware device 108.

Figure 4A:
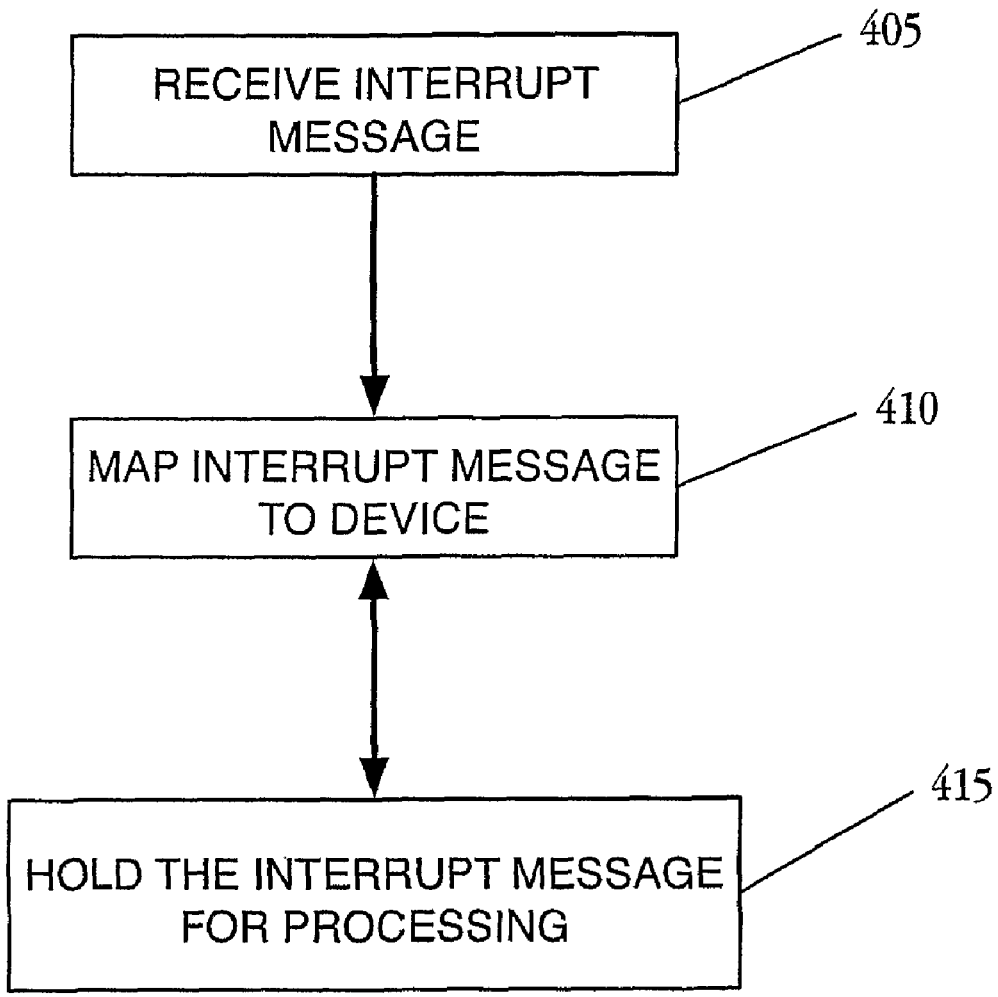
FIG. 4A is a flowchart of a method according to embodiments of the present invention.

FIG. 4A is a flowchart of a method according to embodiments of the present invention. In an embodiment the operations depicted in FIG. 4A are carried out by an adapter module 212 as depicted in FIG. 2 and described above. At block 405, a message is received by the adapter module 212 from the OS driver module 226. In one embodiment, the message is an interrupt message. In an alternate embodiment, the message is an interrupt URB message. The adapter module 212 maps the interrupt message to the appropriate hardware device 108 at block 410. At block 415, the adapter module 212 holds the interrupt message for processing. Through this mechanism, the adapter module provides a mechanism by which the host operating system can query attached hardware devices for input data or for status. One example of such an operation is that of an input device, such as a keyboard. As the host operating system starts up it sends an interrupt message to the keyboard setting up a communications path by which it can receive periodic input data, such as keystrokes. In the context of the present discussion, the host operating system without the adapter module 212 would be unable to communicate with a hardware device 108 that is not configured to communicate using a protocol supported by the OS driver module 226. Using the operations described here, the host operating system enables this communications path using the adapter module 212 as the destination for any messages requesting input data, or interrupt messages.

Figure 4B:
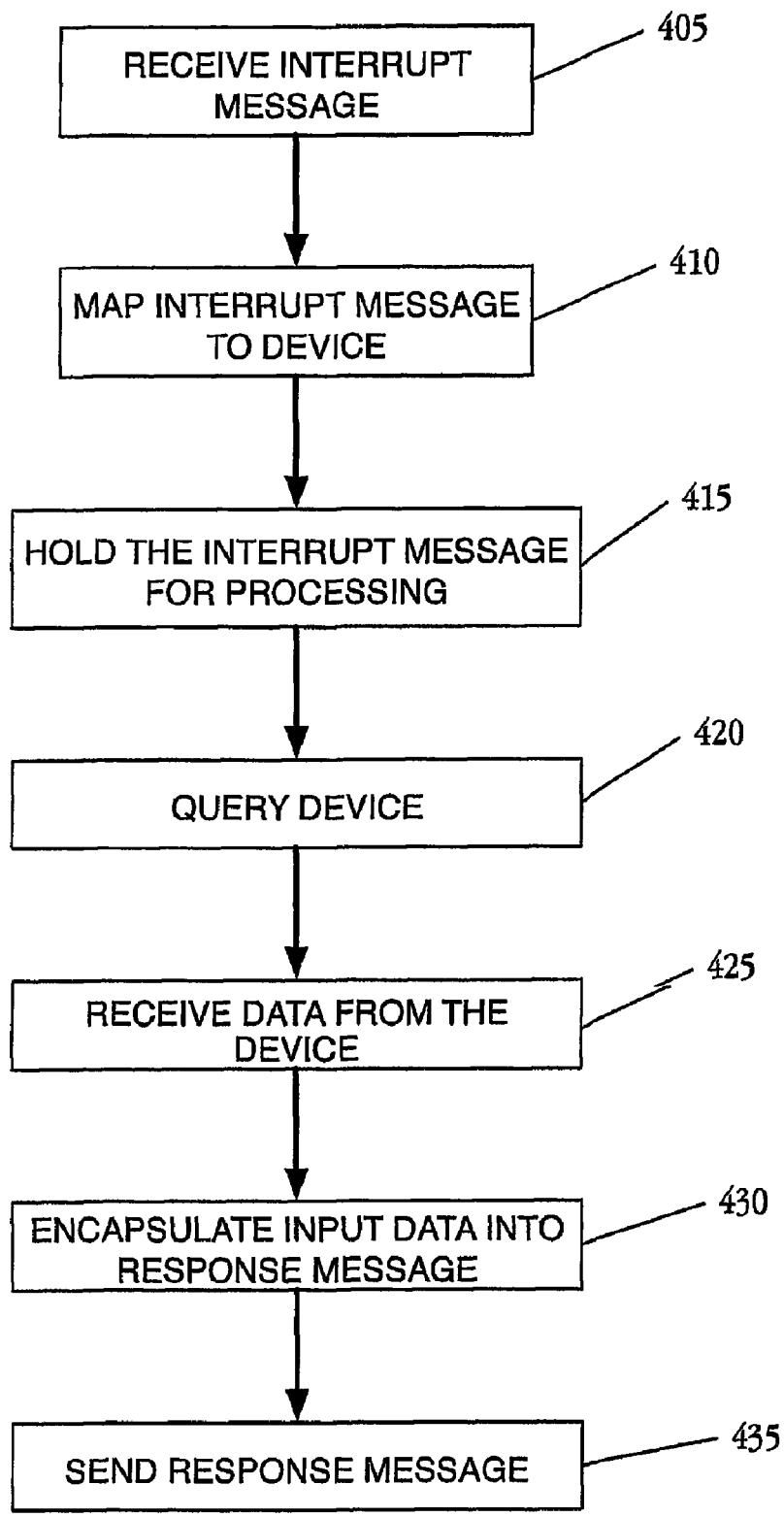
FIG. 4B is a flowchart of a method according to embodiments of the present invention.

FIG. 4B is a flowchart of a method according to embodiments of the present invention. In an embodiment, the operations depicted in FIG. 4B are carried out by an adapter module 212 as depicted in FIG. 2 and described above. FIG. 4B is similar to FIG. 4A with the addition of operations to receive data from a hardware device 108.

Operations to configure the communications path for a hardware device proceed as depicted above with respect to FIG. 4A. During normal operations following configuration, the adapter module 212 queries the hardware device for input data at block 420 in one embodiment. In one embodiment, querying the hardware device 108 includes periodically polling the hardware device 108. In another embodiment, the hardware device is queried for data following the receipt of the interrupt message at block 405 and the mapping of the message to the hardware device 410. In this embodiment, the host operating system may be sending data items to the hardware device 108 in the context of the hardware device 108 being a mass storage device, such as a hard drive.

At block 425, the hardware device sends data in response to the query. In one embodiment, the data is input data, such as keystrokes. At block 430, the input data is encapsulated into a response message. In an embodiment, the response message is an interrupt URB response message. At block 435, the adaptor module sends the response message to the OS driver module 226. It will be understood that in the context if input devices or mass storage devices that the operations depicted at blocks 420 through 435 are essentially continuous facilitating the receipt of multiple keystrokes or the storing and retrieval of data on a mass storage device.

Figure 5A:
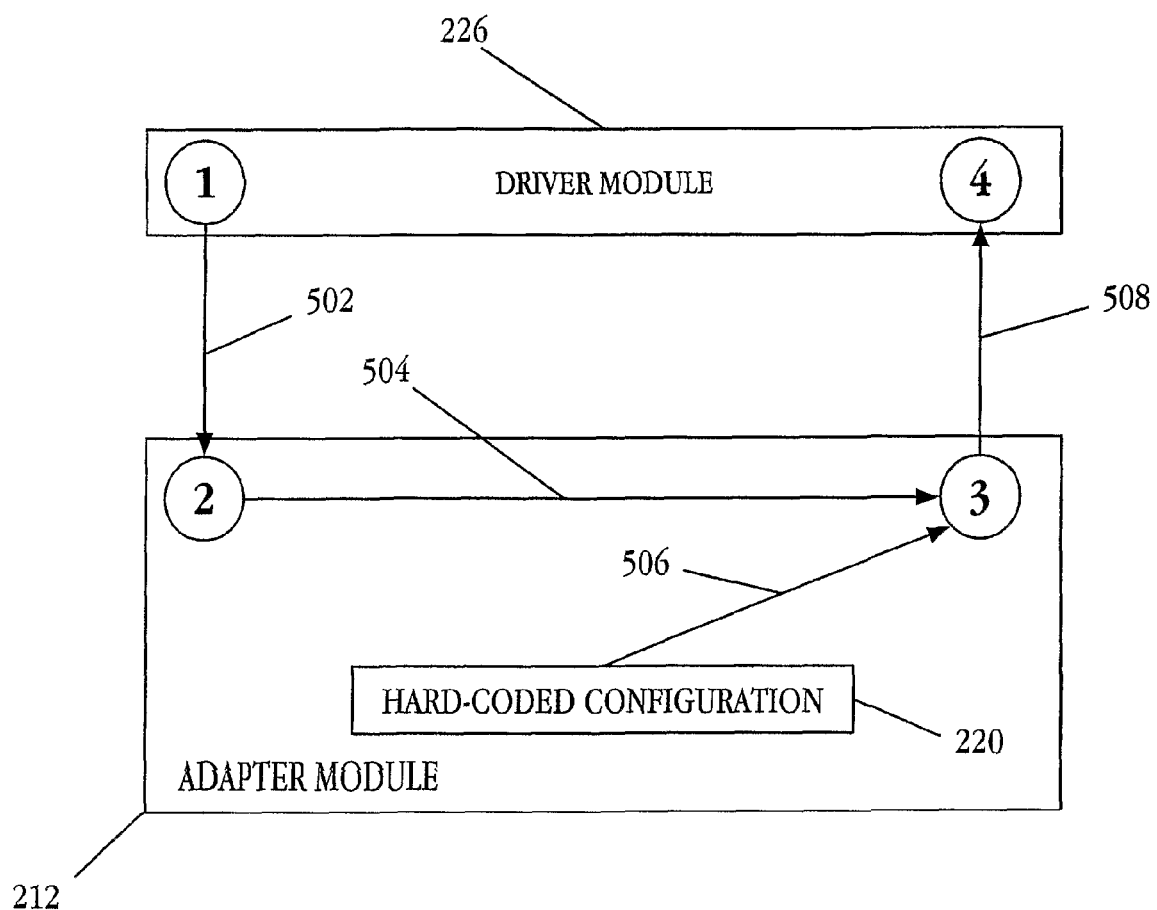
FIG. 5A is an exemplary dataflow diagram to be carried out on a device according to embodiments of the present invention.

FIG. 5A is an exemplary dataflow diagram carried out on a device according to embodiments of the present invention. For the purposes of illustration the OS driver module 226 is configured to communicate using the USB protocol and the hardware device is configured to communicate using the PS/2 protocol. This is not meant to be limiting in any manner as the dataflow described herein has equal applicability to any hardware device communicating data to a host operating system through an adapter module as contemplated and described above.

The OS driver module 226 sends 502 a URB to the adapter module 212, the adapter module 212 appearing to the OS driver module 226 as a USB device. The URB is received by the adapter module 212 which maps 504 the URB to the appropriate hardware device requested by the URB and reads 506 the configuration data for that device. The configuration data is stored as hard-coded configuration data as described above with respect to FIG. 2. The configuration data is encapsulated within the URB and that URB is sent back 508 to the driver module. Through these operations the host operating system can request and receive configuration data for a hardware device, even though that hardware device can not communicate directly with the OS driver module 226 using the communications protocol supported by the driver module.

Figure 5B:
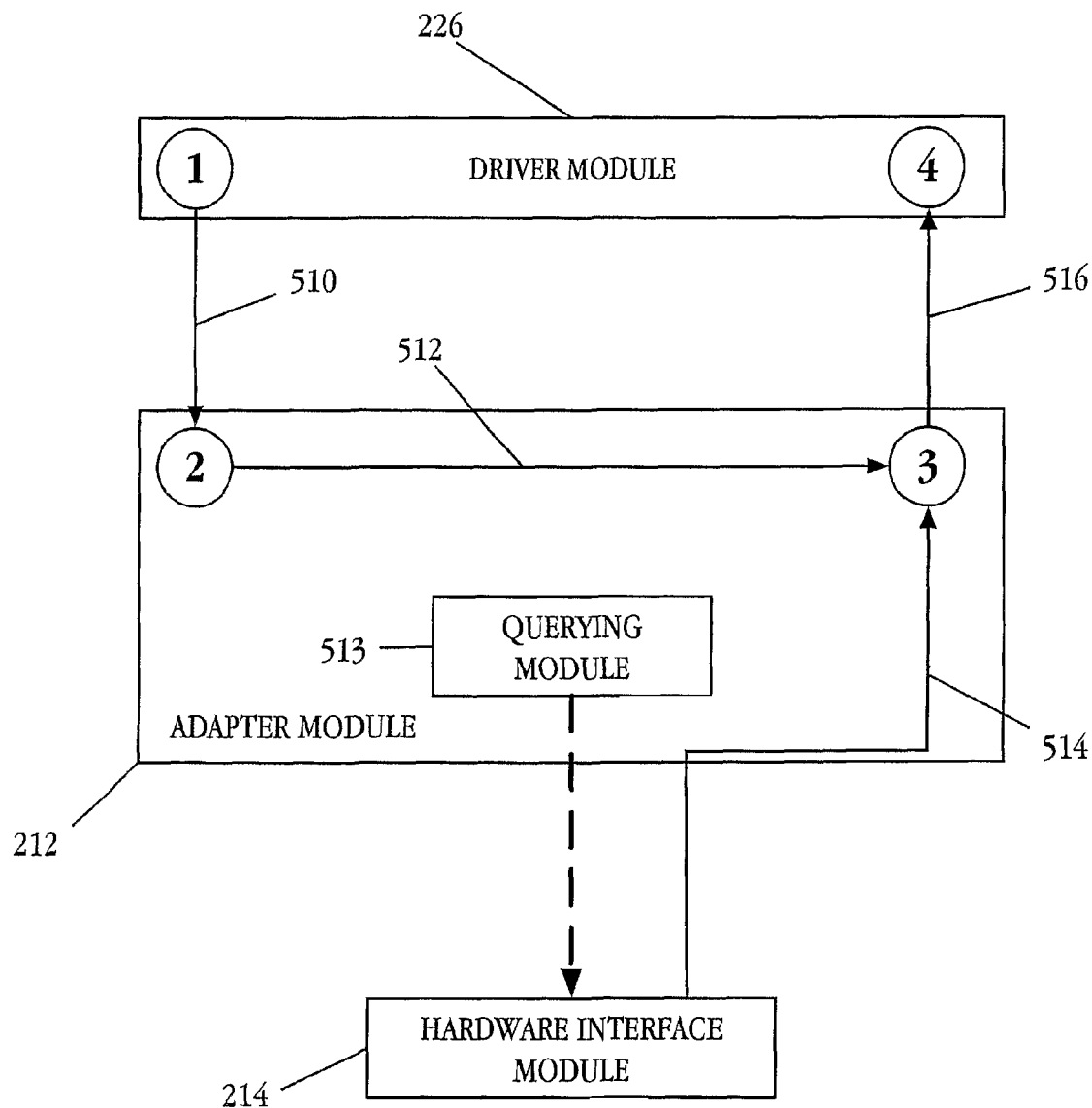
FIG. 5B is an exemplary dataflow diagram to be carried out on a device according to embodiments of the present invention.

FIG. 5B is an exemplary dataflow diagram carried out on a device according to embodiments of the present invention. For the purposes of illustration the OS driver module 226 is configured to communicate using the USB protocol and the hardware device is configured to communicate using the PS/2 protocol. This is not meant to be limiting in any manner as the dataflow described herein has equal applicability to any hardware device communicating data to a host operating system through an adapter module as contemplated and described above.

The driver module generates an interrupt URB and sends 510 the interrupt URB to the adapter module 212. The adapter module maps 512 the interrupt URB to the appropriate device and holds the interrupt URB for further processing and receipt of input data from the appropriate device. The adapter module 212 and more particularly a querying module 513 of the adapter module 212 periodically polls the appropriate device, or more particularly the hardware interface module 214 coupled to the appropriate device. When input data in the form of a PS/2 packet is sent 514 from the hardware interface module 214 in response to the query it is encapsulated 512 into the original interrupt URB. This URB, the original interrupt URB with the encapsulated input data is sent 516 as a URB to the OS driver module 226. The operations and dataflow for input data may be continuous in the context of a keyboard receiving keystrokes from a user.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments of the invention. Combinations of the above embodiments and other embodiments not specifically described herein will be apparent to those of skill in the art upon reviewing the above description.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the scope or meaning of the claims. Additionally, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the terms "comprising" and "wherein," respectively. Moreover, the terms "first," "second," and "third," etc. are used merely as labels, and are not intended to impose numerical requirements on their objects.

What is claimed is:

1. An apparatus comprising:

a driver module to generate a request for data and to receive one or more responses to the request, the driver module operable to communicate with one or more devices using a Universal Serial Bus protocol;

a hardware interface module operable to be coupled to one or more hardware devices, wherein the one or more hardware devices operate using a protocol other than the Universal Serial Bus protocol; and an adapter module implemented in software and separately coupled to the driver module and to the hardware interface module so that the driver module and the hardware interface module are coupled through the adapter module, wherein the adapter module is coupled to and is operable to communicate with the driver module as a Universal Serial Bus device, wherein the adapter module includes hard-coded hardware device data corresponding to the one or more hardware devices, including for each particular hardware device a configuration data that corresponds to a protocol type used by that particular hardware device for communication, the adapter module operable to enable the driver module to provide a query to the hardware interface for input data or for a status related to a given hardware device, the query in the form of a URB interrupt, and wherein the adaptor module is operable to map the query to an appropriate hardware device based on the hard-coded hardware device data stored in the adaptor module, the adaptor module operable to hold the query for further processing and until receipt of input data from the appropriate hardware device, to periodically poll the hardware interface connected to the appropriate hardware device, and when input data is sent from the hardware interface of the appropriate hardware device in response to the query, to encapsulate the input data into the original query and to send the original query and the encapsulated input data to the driver module,
wherein the driver module would be unable to communicate directly with the appropriate hardware device using the Universal Serial Bus protocol.

2. The apparatus of claim 1, wherein the appropriate hardware device is an input device.

3. The apparatus of claim 2, wherein the input device is a PS/2 input device.

4. The apparatus of claim 1, wherein the appropriate hardware device is a mass storage device.

5. A method, comprising:
receiving at an adaptor module a configuration request from a driver module, wherein the adaptor module is implemented in software and is configured to communicate with the driver module using a Universal Serial Bus protocol and the adaptor module appears to the driver module as a Universal Serial Bus device, and wherein the request includes a request for configuration data related to a hardware device, wherein the hardware device is configured to communicate using a protocol other then the Universal Serial Bus protocol;
retrieving from the adaptor module the configuration data related to the configuration request, wherein retrieving the configuration data related to the configuration request includes mapping the configuration request to an appropriate hardware device based on hard-coded configuration data previously stored in the adaptor module, the configuration data including endpoint data defined by the Universal Serial Bus specification;
encapsulating the configuration data into a response message; and
sending the response message to the driver module.

6. The method of claim 5, wherein the driver module is executed as part of an operating system executed on a computing device.

7. The method of claim 6, wherein the operating system is a Linux operating system.

8. A method comprising:
receiving at an adaptor module an interrupt message from a driver module, wherein the adapter module is implemented in software and is configured to communicate with the driver module using a Universal Serial Bus protocol and wherein the adaptor module appears to the driver module as a Universal Serial Bus device, wherein the interrupt message includes a query directed to one or more hardware devices, wherein the one or more hardware devices are configured to communicate using a protocol other then the Universal Serial Bus protocol;
mapping the interrupt message to the an appropriate hardware device, wherein the mapping is based on hard-coded configuration data previously stored in the adaptor module;
holding the interrupt message for processing;
querying the appropriate hardware device for input data, wherein the appropriate hardware device is selected for querying based on the mapping of the interrupt message;
receiving input data from the appropriate hardware device;
encapsulating the input data into a response message using a Universal Serial Bus protocol; and
sending the response message to the driver module.

9. The method of claim 8, wherein querying the appropriate hardware device for input data includes periodically polling the appropriate hardware device.

10. The method of claim 8, wherein the input data is received within a PS/2 packet.

11. The method of claim 8, wherein the appropriate hardware device devices is an input device.

12. The method of claim 8, wherein the appropriate hardware device devices is a mass storage device.

13. A system, comprising:
a PCI bus; and
a storage device coupled to the PCI bus, the storage device having instructions contained therein which when executed cause to be operated the following software modules:
a driver module to generate a request for data and to receive one or more responses to the request, the driver module operable to communicate with one or more devices using a Universal Serial Bus protocol;
a hardware interface module operable to be coupled to one or more hardware devices, wherein the one or more hardware devices operate using a protocol other than the Universal Serial Bus protocol; and
an adapter module implemented in software and separately coupled to the driver module and to the hardware interface module so that the driver module and the hardware interface module are coupled through the adapter module, wherein the adapter module is coupled to and is operable to communicate with the driver module as a Universal Serial Bus device,
wherein the adapter module includes hard-coded hardware device data corresponding to the one or more hardware devices, including for each particular hardware device a configuration data that corresponds to a protocol type used by that particular hardware device for communication,
the adapter module operable to enable the driver module to provide a query to the hardware interface for input data or for a status related to a given hardware device, the query in the form of a URB interrupt, and wherein the adaptor module is operable to map the query to an appropriate hardware device based on the hard-coded hardware device data stored in the adaptor module, the adaptor module operable to hold the query for further processing and until receipt of input data from the appropriate hardware device, to periodically poll the hardware interface connected to the appropriate hardware device, and when input data is sent from the hardware interface of the appropriate hardware device in response to the query, to encapsulate the input data into the original query and to send the original query and the encapsulated input data to the driver module, and wherein the driver module would be unable to communicate directly with the appropriate hardware device using the Universal Serial Bus protocol.

14. The system of claim 13, wherein the hard-coded configuration includes one or more hard-coded interfaces.

15. The system of claim 13, wherein the one or more hard-coded interfaces includes one or more hard-coded endpoints.

* * * * *

UNITED STATES PATENT AND TRADEMARK OFFICE
CERTIFICATE OF CORRECTION

| | | |
|---|---|---|
| PATENT NO. | : 8,239,585 B2 | Page 1 of 1 |
| APPLICATION NO. | : 11/992862 | |
| DATED | : August 7, 2012 | |
| INVENTOR(S) | : Wang et al. | |

It is certified that error appears in the above-identified patent and that said Letters Patent is hereby corrected as shown below:

In the Claims

In column 8, line 7, in Claim 11, after "device", delete "devices", therefor

In column 8, line 9, in Claim 12, after "device", delete "devices", therefor

Signed and Sealed this
Fifteenth Day of September, 2015

Michelle K. Lee
*Director of the United States Patent and Trademark Office*